United States Patent
Braun et al.

(10) Patent No.: US 9,062,713 B2
(45) Date of Patent: Jun. 23, 2015

(54) SLIDE BEARING

(75) Inventors: Wolfgang Braun, Garstadt (DE); Sergej Schwarz, Nuremberg (DE); Arbogast Grunau, Weisendorf (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 0 days.

(21) Appl. No.: 14/125,994

(22) PCT Filed: Jun. 12, 2012

(86) PCT No.: PCT/EP2012/061076
§ 371 (c)(1),
(2), (4) Date: Dec. 13, 2013

(87) PCT Pub. No.: WO2012/171897
PCT Pub. Date: Dec. 20, 2012

(65) Prior Publication Data
US 2014/0119681 A1 May 1, 2014

(30) Foreign Application Priority Data
Jun. 15, 2011 (DE) .......... 10 2011 077 556

(51) Int. Cl.
| F16C 17/00 | (2006.01) |
| F16C 33/10 | (2006.01) |
| F16C 32/06 | (2006.01) |
| F16C 35/02 | (2006.01) |
| F16C 33/04 | (2006.01) |
| F16C 33/12 | (2006.01) |

(52) U.S. Cl.
CPC ............ *F16C 33/043* (2013.01); *F16C 33/103* (2013.01); *F16C 33/121* (2013.01); *F16C 2202/04* (2013.01); *F16C 2206/04* (2013.01); *F16C 2240/54* (2013.01); *F16C 32/0629* (2013.01)

(58) Field of Classification Search
USPC ............... 385/273, 276, 288, 294, 296, 907, 385/907.1; 384/273, 276, 288, 294, 296, 384/907, 907.1, 129, 286, 290, 625, 913
See application file for complete search history.

(56) References Cited

U.S. PATENT DOCUMENTS

| 3,950,141 | A | * | 4/1976 | Roemer .................. 428/643 |
| 6,264,209 | B1 | * | 7/2001 | Miya et al. .............. 279/46.2 |
| 7,771,120 | B2 | * | 8/2010 | Kagohara et al. ........ 384/294 |
| 2005/0196085 | A1 | * | 9/2005 | Tsuji et al. .............. 384/398 |
| 2005/0242156 | A1 | * | 11/2005 | Jabs et al. ............... 228/101 |
| 2009/0211390 | A1 | * | 8/2009 | Brogardh et al. .......... 901/28 |
| 2011/0142384 | A1 | * | 6/2011 | Hofmann ................ 508/109 |
| 2012/0088701 | A1 | * | 4/2012 | Suzuki et al. ............ 508/109 |
| 2013/0288003 | A1 | * | 10/2013 | Foege et al. ............. 428/143 |

FOREIGN PATENT DOCUMENTS

| DE | 4338768 A1 * | 5/1995 | .............. F02B 75/32 |
| DE | 10061397 | 5/2002 | |
| DE | 202006014691 | 1/2007 | |
| DE | 102008037871 | 2/2010 | |
| JP | 2002235748 | 8/2002 | |
| JP | 2004007895 A * | 1/2004 | .............. H02N 2/00 |

(Continued)

*Primary Examiner* — Marcus Charles
(74) *Attorney, Agent, or Firm* — Volpe and Koenig, P.C.

(57) ABSTRACT

A slide bearing including a rotating friction partner, a counterpart and a lubrication film between the friction partner and the counterpart, wherein the friction partner or the counterpart is coated with a hard material.

8 Claims, 1 Drawing Sheet

(56) References Cited

FOREIGN PATENT DOCUMENTS

| | | | | |
|---|---|---|---|---|
| JP | 2005233335 A | * | 9/2005 | ............. F16C 17/14 |
| JP | 2006297742 A | * | 11/2006 | ............. B29C 33/38 |
| JP | 2008121761 A | * | 5/2008 | ............. F16C 33/10 |
| JP | 2012031935 A | * | 2/2012 | ............. F16C 33/12 |
| WO | 2005106065 | | 11/2005 | |
| WO | WO 2007060088 A1 | * | 5/2007 | ............. C22C 29/06 |

* cited by examiner

SLIDE BEARING

FIELD OF THE INVENTION

The invention relates to a slide bearing, in particular, a hydrodynamic slide bearing. Such a slide bearing has, in general, a rotating friction partner, a counterpart supporting the rotating friction partner, and a lubricating film between the friction partner and the counterpart.

BACKGROUND

At high loads and low relative speeds, the friction partner and the counterpart of the slide bearing move in the so-called mixed friction state. This means that the rotating friction partner is not supported completely by the intermediate lubricating film, but instead there is surface contact between the rotating friction partner and the counterpart. This surface contact results in wear both on the friction partner and also on the counterpart.

In general, the friction partner that has a circumferential load, that is, usually a shaft, that should have a higher microhardness than the counterpart. Due to this construction, the surface contours of the counterpart are adapted to the contours of the friction partner usually constructed as a shaft. After the initial run-in wear, this adaption of the contours causes a reduced wear in the area of the mixed friction.

The friction in the so-called hydrodynamic state, that is, in the sliding friction state in which the friction partner is completely supported by the lubricating film and is thus also completely separated from the counterpart, is determined by the surface quality, that is, the roughness and tolerances, as well as its interaction with the lubricant used as the lubricating film.

According to the prior art, the counterpart is provided with a surface layer made from white metal or bronze. The friction partner has a surface made from hardened steel or a hard chrome-plated surface. With this material pairing, frequent operation of the slide bearing in the mixed friction region leads to premature damage and thus premature failure of the slide bearing due to the high surface wear on the counterpart.

SUMMARY

Starting from here, the invention is based on the objective of increasing the service life of a slide bearing.

To meet the objective, the invention starts from the basic idea that the wear during the operation of the slide bearing in the mixed friction operation must be minimized. This is achieved by a material pairing on the surface of the friction partner and the counterpart that guarantee a transition from the mixed friction operation into the hydrodynamic operation even at low rotational speeds and simultaneously have a high wear resistance in the mixed friction operation.

The solution of the problem is provided by one or more features of the invention. The dependent claims relate, in part, to advantageous refinements of the invention and, in part, to refinements that are themselves inventive.

According to the invention either the friction partner or the counterpart is coated with a hard material. Advantageously, the friction partner with the circumferential load, that is, usually the shaft, is coated with a hard material layer. In this way, due to the changed chemical properties of the surface, the friction in the hydrodynamic state is reduced (changed wetting characteristics) and the wear resistance increases in the mixed friction operation.

In the preferred construction, the hard material layer has a Vickers hardness (HV) of at least 800 HV. Advantageously, the Vickers hardness (HV) is at least 1000 HV. The goal of the invention is to construct the hard material layer so that the Vickers hardness (HV) is set in the interval between 1000 HV and 2500 HV.

In another advantageous construction it is provided, for a friction partner with a Vickers hardness (HV) between 1000 HV and 2500 HV, to provide the counterpart with a surface layer that has a Vickers hardness (HV) up to 700 HV. If the slide bearing is constructed so that the hard material layer on the counterpart is in the higher range, accordingly the surface layer on the friction partner is designed with a Vickers hardness (HV) of 700 HV.

In another advantageous construction, this leads to the result that the hard material layer on the friction partner has at least twice to three-times the hardness of the associated surface layer of the counterpart. Conversely, if the counterpart has the hard material layer, this is in turn twice to three-times as hard as the surface layer of the associated friction partner.

In another advantageous construction, the hard material layer has a surface roughness (Rz) of less than 1.5, advantageously less than 1. The surface roughness of the associated surface layer also lies advantageously below Rz=1.5 and advantageously below Rz=1.

In another advantageous construction, the hard material layer is constructed as a diamond-like coating. In particular, it is constructed as an amorphous carbon layer, so-called DLC layer. As an alternative to using an amorphous carbon layer as a hard material layer, the surface hardness of the hard material layer can be produced and increased by carbonitriding.

A hard diamond-like coating with the brand name "Triondur®" made in-house by the applicant [Schaeffler Technologies AG & Co. KG] has proven especially suitable.

The layer thickness of the hard material layer is advantageously less than 20 μm. A layer thickness in the range from 1 μm to 10 μm is considered especially suitable. In this construction of the layer thickness of the hard material layer, the elasticity of the friction partner or counterpart coated with the hard material layer is not adversely affected.

In one advantageous construction—as already discussed above—the shaft is constructed as the friction partner and the bearing shell of the slide bearing is constructed as the counterpart. In another advantageous construction, an inner bearing ring could also be arranged on the shaft and/or an outer bearing ring could also be arranged within the bearing shell. The use of inner and outer bearing rings promotes easier manufacturability or installability of the slide bearing. In addition, the use of inner and outer bearing rings promotes the exchangeability of the corresponding inner and outer bearing rings with the simultaneous reuse of the other bearing components in the case of bearing damage.

BRIEF DESCRIPTION OF THE DRAWINGS

The invention is described in more detail with reference to the embodiment shown in the figures. Shown are.

DETAILED DESCRIPTION OF THE PREFERRED EMBODIMENT

In the following description, matching parts are provided with the same reference symbols.

Figure 1:
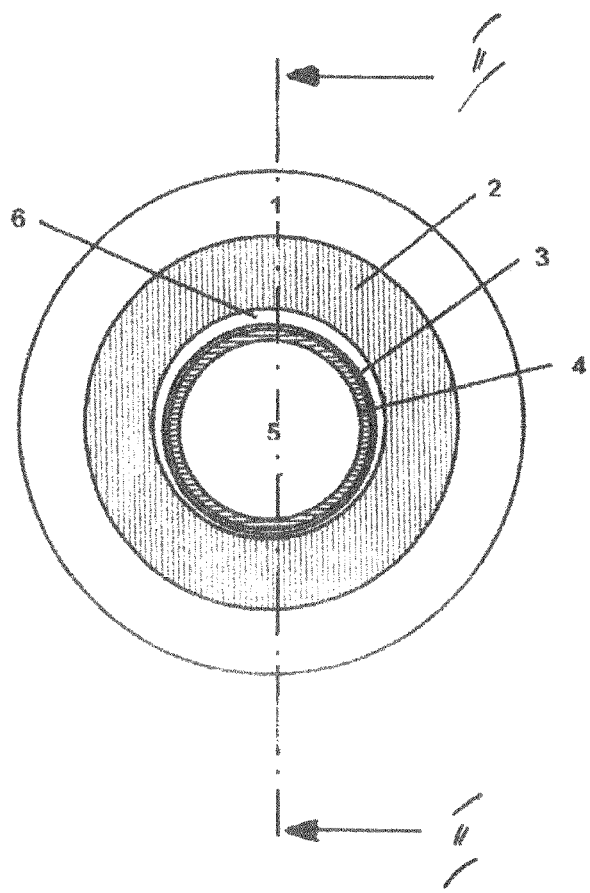
FIG. 1 a side view of the slide bearing according to the invention.
Figure 2:
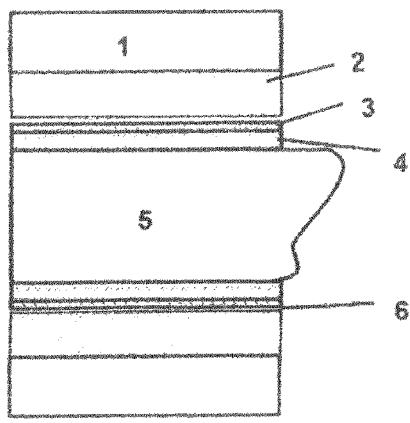
FIG. 2 the section II-II from FIG. 1.

In FIG. 1 it can be seen that the slide bearing is enclosed on the outside by the housing 1 acting as a bearing shell. The outer bearing ring 2 enclosed by the housing 1 is held by the housing 1. In the outer bearing ring 2 sits the inner bearing ring 4 carrying the hard material layer 3. On its side, the inner bearing ring 4 is shrunk onto the shaft 5. Finally, the bearing gap 6 can be seen between the hard material layer 3 and the outer bearing ring 2. The lubricant that is not shown in the figures of the drawing and forms the lubricating film during operation is introduced into the bearing gap 6.

Thus, in the embodiment, with its inner bearing ring 4, the shaft 5 forms the friction partner to the slide bearing. In contrast, with its outer bearing ring 2, the housing 1 forms the counterpart of the slide bearing. In the embodiment, the inner bearing ring 4 on the shaft 5 carries the hard material layer 3 that can be formed of the materials specified in the general portion of the description. The function of the slide bearing is the following:

When the shaft 5 starts moving, the inner bearing ring 4 slides partially over the outer bearing ring 2, wherein the hard material layer 3 and the surface layer of the outer bearing ring 2 touch. Due to the centrifugal forces produced with the rotation, the lubricant penetrates into all areas of the bearing gap 6, so that the shaft 5 centers itself in the bearing such that the shaft 5 is supported in rotation by the lubricating film in the bearing gap 6, so that there is no longer contact between the hard material layer 3 and the surface layer of the outer ring 2.

In the previously described embodiment, the inner bearing ring 4 was coated with the hard material of the hard material layer 3. It is understood that, in a modified embodiment, it can be provided that the surface of the shaft 5 is coated with the hard material of the hard material layer 3, especially if no inner bearing ring 4 is provided. It is further understood that, in another modified embodiment, it can be provided that instead of the shaft 5 or instead of the inner bearing ring 4, the outer bearing ring 2 can be provided with the hard material of the hard material layer 3, wherein it is likewise understood that, in a, in turn, modified embodiment, it can be provided that the inner surface of the hole of the housing 1 pointing toward the shaft 5 is coated with the hard material of the hard material layer 3, especially if no outer bearing ring 2 is provided.

LIST OF REFERENCE SYMBOLS

1 Housing
2 Outer bearing ring
3 Hard material layer
4 Inner bearing ring
5 Shaft
6 Bearing gap

The invention claimed is:

1. Slide bearing comprising: a rotating friction partner, a counterpart, and a lubricating film between the friction partner and the counterpart, the friction partner comprises a shaft and an inner ring fixed to the shaft, wherein the inner ring is coated with a hard material, and the counterpart comprises an outer ring and a housing that supports the outer ring.

2. The slide bearing according to claim 1, wherein the hard material comprises a hard material layer with a Vickers hardness (HV) of at least 800 HV.

3. The slide bearing according to claim 2, wherein a layer thickness of the hard material layer is less than 20 μm.

4. The slide bearing according to claim 3, wherein the layer thickness is between 1 μm and 10 μm.

5. The slide bearing according to claim 1, wherein the hard material comprises a hard material layer with a Vickers hardness (HV) in a range from at least 1000 HV to 2500 HV.

6. The slide bearing according to claim 5, wherein one of the friction partner or the counterpart includes the hard material layer with the Vickers hardness in the range from 1000 HV to 2500 HV and other of the friction partner or the counterpart has a surface layer with a Vickers hardness (HV) of up to 700 HV.

7. The slide bearing according to claim 6, wherein a surface roughness (Rz) of the hard material layer and the associated surfaces is less than 1.5.

8. The slide bearing according to claim 1, wherein the hard material comprises a hard material layer made of an amorphous carbon layer (DLC).

* * * * *